(12) United States Patent
Mazur

(10) Patent No.: US 7,470,857 B2
(45) Date of Patent: Dec. 30, 2008

(54) NONMETALLIC RAINTIGHT HUB

(76) Inventor: Leo Mazur, 44 Lenape Ave., Newton, NJ (US) 07860

( * ) Notice: Subject to any disclaimer, the term of this patent is extended or adjusted under 35 U.S.C. 154(b) by 228 days.

(21) Appl. No.: 11/497,144

(22) Filed: Aug. 1, 2006

(65) Prior Publication Data

US 2007/0070586 A1    Mar. 29, 2007

Related U.S. Application Data

(60) Provisional application No. 60/705,091, filed on Aug. 3, 2005.

(51) Int. Cl.
*H05K 5/02* (2006.01)
(52) U.S. Cl. .................................................. 174/51
(58) Field of Classification Search ............... 174/74 R, 174/79, 82, 84 R, 84 C; 439/465, 467, 445, 439/459, 610
See application file for complete search history.

(56) References Cited

U.S. PATENT DOCUMENTS

| | | | |
|---|---|---|---|
| 1,382,741 A | 6/1921 | Pierson | |
| 2,651,008 A | 9/1953 | Johansson | |
| 2,862,040 A * | 11/1958 | Curran | 174/51 |
| 2,941,025 A * | 6/1960 | Wayman | 174/653 |
| 2,972,656 A | 2/1961 | Fisher | |
| 3,238,422 A | 3/1966 | Fisher | |
| 3,628,097 A | 12/1971 | Kobryner | |
| 3,910,608 A * | 10/1975 | Phillips, Jr. | 285/154.4 |
| 4,030,742 A * | 6/1977 | Eidelberg et al. | 285/343 |
| 4,249,758 A * | 2/1981 | Harris | 285/136.1 |
| 5,718,608 A * | 2/1998 | Guiol | 439/610 |
| 6,042,396 A * | 3/2000 | Endo et al. | 439/98 |
| 6,649,839 B2 * | 11/2003 | Eckert et al. | 174/74 R |
| 6,870,106 B1 * | 3/2005 | Schiffbauer et al. | 174/74 R |

OTHER PUBLICATIONS

SCEPTER (a division of IPEX), current on line catalog, Part # MHU35.
SCEPTER (a division of IPEX), current on line catalog, Part # JBA35.
Adjusta-Post Lighting Company, current on line catalog, Part # 347 & 349.

* cited by examiner

*Primary Examiner*—William H Mayo, III

(57) ABSTRACT

A rigid nonmetallic electrical conduit fitting to provide the means to attach a rigid nonmetallic conduit to the top of a raintight enclosure were by maintaining the raintight integrity of the enclosure.

1 Claim, 3 Drawing Sheets

NONMETALLIC RAINTIGHT HUB

CROSS-REFERENCE TO RELATED APPLICATIONS

This application claims the benefit of provisional patent application Ser. No. 60/705,091 filed 2005 Aug. 3 by the present inventor.

FEDERALLY SPONSORED RESEARCH

Not Applicable

SEQUENCE LISTING

Not Applicable

BACKGROUND OF THE INVENTION

This invention relates to a Rigid Nonmetallic Conduit fitting specifically one, which attaches the pipe to the top of a watt-hour meter enclosure or other raintight enclosure.

The use a flange like connector for electoral pipe to prohibit the introduction of water, dust or fumes into an electrical enclosure has long been recognized. U.S. Pat. No. 1,382,741 to Pierson (1921), U.S. Pat. No. 2,862,040 to Curran (1958) and U.S. Pat. No. 3,910,608 to Phillips, Jr. (1975) are good examples of how this system was used in the past. Furthermore U.S. Pat. No. 2,651,008 to Johansson (1953), U.S. Pat. No. 3,628,097 to Kobryner (1971), U.S. Pat. No. 2,972,656 to Fisher (1961) and U.S. Pat. No. 3,238,422 also to Fisher (1966) teach the use of such "detachable" flanges in connection with watt-hour meter enclosures.

To date these flanges, known in the industry as "Meter Hubs" (or simply "Hubs" when used in connection with other raintight enclosures such as panel boxes and disconnects), have been made of metal and had a female threaded hole which could be screwed onto a rigid metallic conduit or a "Raintight" connector (suitable for the type wiring method used). The enclosures they are used with commonly have a circular protrusion at the top through which the conductors enter the box and threaded protrusions for the mounting screws. The before mentioned hubs contain corresponding recesses which create a "flashing effect" to prohibit the introduction of water thus making the enclosure "raintight".

These "Meter Hubs" most often contain an inner ring that acts like a bushing to keep the conductors away from the sharp edges of the sheet metal enclosure. However, this ring often contains sharp burs left over from the casting process, which pose a hazard to the insulation of the conductors themselves. It is a common practice in the field by some of the better craftsman (but definitely not all) to debur the "Meter Hub" before installation.

The present method of connecting a rigid nonmetallic conduit (commonly known as PVC) to a watt-hour meter enclosure (or other rain-tight enclosure) is to glue the pipe into a male adapter that has been threaded into a "Meter Hub" that is attached to a watt-hour meter enclosure by the mounting screws. The inconsistencies due to manufacturing and the common practice of "drawing" the semi-flexible pipe to the wall with a strap, instead of bending a proper offset in the conduit, can cause a possible leak hazard in the male adapter.

There is a rigid nonmetallic meter hub available from some manufactures. Scepter® (a division of IPEX) part number MHU35 (product code 077965) is an example of this fitting. However, this fitting utilizes a similar "female type connection" to the conduit as does the male adapter in the above mentioned installation and is therefore susceptible to the same possible leak hazard.

"Male end" connectors have been available from many manufacturers and are known as "Box Adapters". An example of this type of fitting would be Scepter® (a division of IPEX) Part number JBA35 (product code 077726). However, this fitting is not intended as a rain-tight fitting, simply a standard connection to an enclosure.

Another common type of flange, found in the electrical industry, that looks very similar to the invention, is used to attach a post light head to a wooden post such as the Pier Base by the Adjusta Post Company (Model # 249). These flanges are made of metal and are manufactured for a different purpose therefore do not have the recesses necessary to conform to a "raintight" enclosure.

BRIEF DESCRIPTION OF THE INVENTION

It is the invention of this invention to provide a remedy to the problems previously stated.

Being made of a nonmetallic non-conductive polymer or composite, it would provide better protection for the insulation of the conductors entering the enclosure without relaying on the installers' integrity.

It is designed as a "male end" which is glued into the flared female end of the conduit or other fitting providing improved connection and water shedding capabilities.

This invention is intended to be an improved method of attaching rigid non-metallic conduit to a watt-hour meter enclosure or other rain-tight enclosure.

DRAWINGS—REFERENCE NUMERALS

Figure 1:
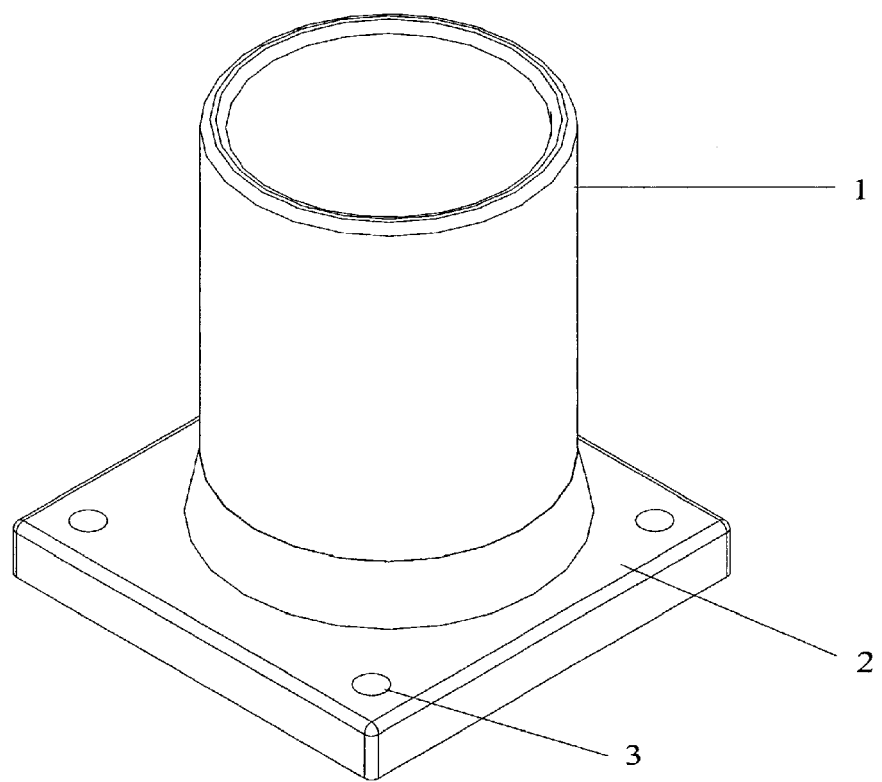
FIG. 1 is an isometric view of the preferred embodiment.

1 Male connection
2 Base of unit
3 Mounting hole
4 Hollow interior
5 Unit as a whole
6 Protrusions in the enclosure that provide rain-tight protection
7 Watt-hour meter enclosure
8 A conduit with an offset and a female flared end

DETAILED DESCRIPTION

Although flanges have been used to connect electrical conduits to enclosures in the past, this invention is a new combination of materials and design meant as an improvement over the present options available.

The preferred embodiment, which is shown in FIG. 1, is meant to be used in conjunction with a watt-hour meter enclosure but can be altered to accommodate other rain-tight enclosures. Typically these enclosures have a circular protrusion though which the conductors past into the enclosure and threaded protrusions for the mounting screws.

In FIG. 1 you can see the male tubular connector 1, the base of the unit 2 that covers the enclosure protrusions and the mounting holes 3. Please note that the male connector 1 is offset on the base 2 in this embodiment to correspond to the same opening in the bottom of the enclosure to allow for the same standard manufactured offset to be used to connect the pipe in both situations. It can also be turned around and used to make the distance between the wall and the opening as small as possible. However, the actual position of the male connector 1 has no bearing on this invention.

Figure 2:
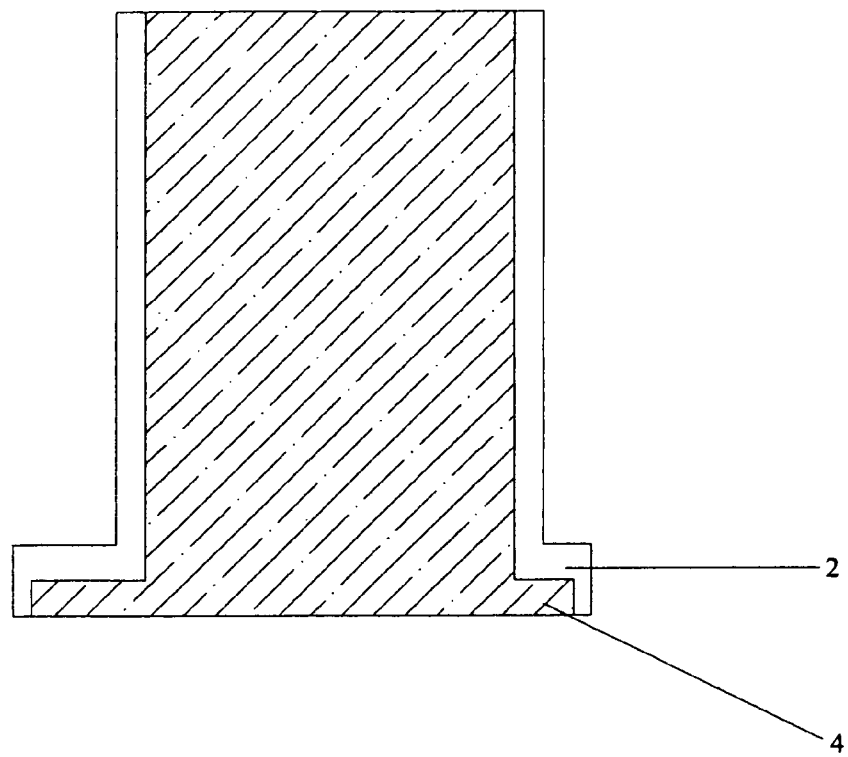
FIG. 2 is a cut away view showing the interior of the invention.

In FIG. 2 the hollow 4 shown would allow the conductors to pass into the enclosure and accommodate the circular protrusion of the enclosure.

Figure 3:
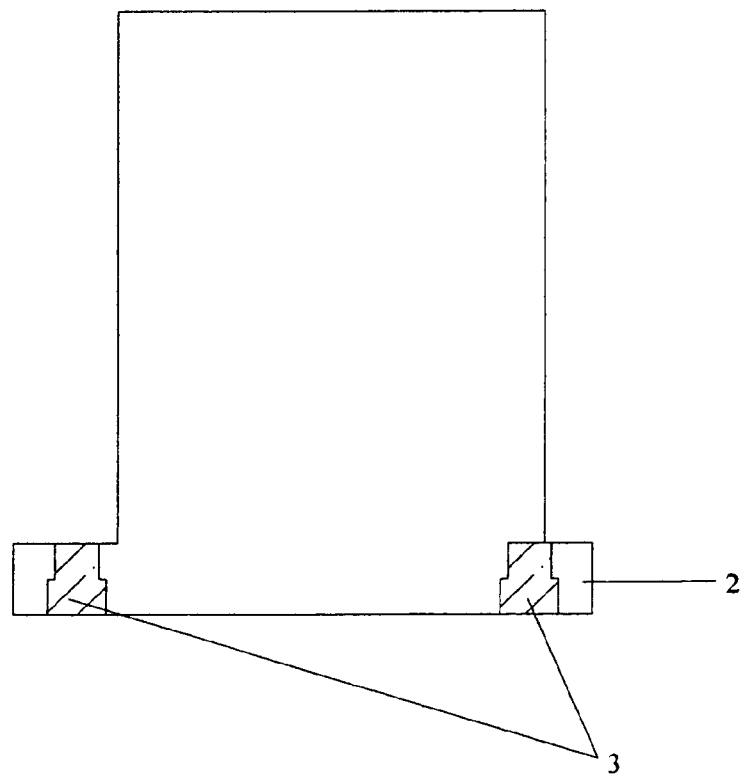
FIG. 3 is a cut away view showing the detail of the screw holes.

Although the holes 3 in FIG. 3 are shown to be stepped to accommodate the mounting protrusion yet making the upper portion smaller to increase its' ability to shed water and add strength to the base 2, they can be a single size.

Figure 4:
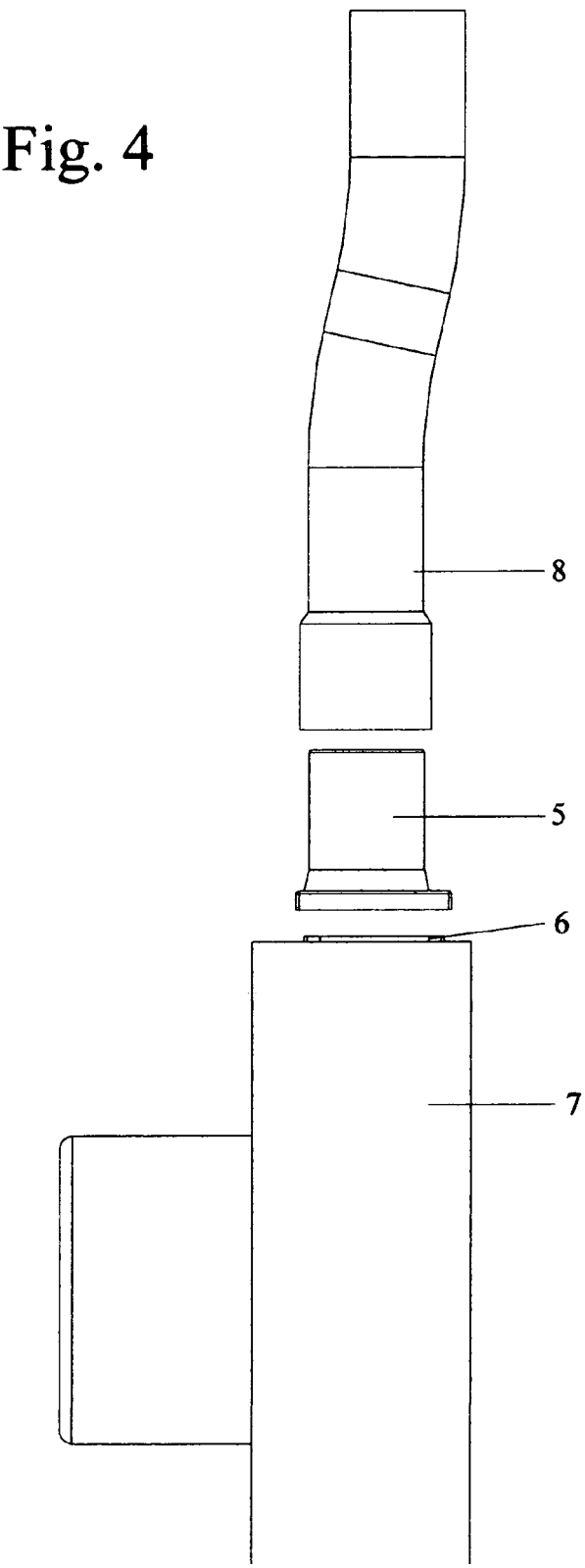
FIG. 4 is an exploded view showing the inventions' intended use with a watt-hour meter Enclosure and how the female flared end of the conduit is fitted to it

In FIG. 4 we see how the various components fit together in an exploded view. The conduits' flared female end 8 would glue to the invention 5 which would then attach to the enclosure 7 covering the protrusion 6 causing a rain-tight installation.

Furthermore, the fact that the invention is an molded one piece nonmetallic part (made of a suitable non-conductive polymer or composite) would increase the integrity of the connection to the enclosure while decreasing the likelihood a leak hazard or damage to the insulation of the conductors.

I claim:

1. A rigid nonmetallic electrical conduit fitting consisting of
   (a) a base with sufficient recesses and mounting holes to allow its' attachment to the top of a raintight enclosure having a circular protrusion though which the conductors past into the enclosure and threaded protrusions for the mounting screws were-by the rain-tight integrity of said enclosure is maintained
   (b) and a tubular extension providing the means to attach a rigid nonmetallic electrical conduit to said enclosure, wherein the diameter of said tubular extension will be sized appropriately so as to allow it to be glued to the inside of the flared end of said conduit or the diameter of said tubular extension could also be sized appropriately so as to allow it to be glued to the inside of the running end of said conduit.

* * * * *